(12) United States Patent
Cheng

(10) Patent No.: US 6,848,935 B2
(45) Date of Patent: Feb. 1, 2005

(54) DATA CONTROL CABLE FOR CONNECTING A MOBILE DEVICE TO A HOST DEVICE

(75) Inventor: Chi-Ming Cheng, Taipei (TW)

(73) Assignee: BenQ Corporation, Tao-Yuan Hsien (TW)

( * ) Notice: Subject to any disclaimer, the term of this patent is extended or adjusted under 35 U.S.C. 154(b) by 13 days.

(21) Appl. No.: 10/250,009

(22) Filed: May 28, 2003

(65) Prior Publication Data

US 2004/0242055 A1 Dec. 2, 2004

(51) Int. Cl.$^7$ ............................................... H01R 11/00
(52) U.S. Cl. ..................................................... 439/502
(58) Field of Search ................................ 439/502–505, 439/506–507

(56) References Cited

U.S. PATENT DOCUMENTS

| | | | | |
|---|---|---|---|---|
| 4,579,407 A | * | 4/1986 | Shimada | ..................... 439/502 |
| 5,540,597 A | * | 7/1996 | Budman et al. | ............... 439/77 |
| 5,758,188 A | * | 5/1998 | Appelbaum et al. | .......... 710/35 |
| 5,774,793 A | * | 6/1998 | Cooper et al. | .............. 455/418 |
| 6,190,190 B1 | * | 2/2001 | Daly et al. | ................... 439/218 |
| 6,210,212 B1 | * | 4/2001 | Niece | .......................... 439/502 |
| 6,498,890 B1 | * | 12/2002 | Kimminau | .................. 385/134 |
| 6,530,085 B1 | * | 3/2003 | Perlman | ...................... 725/82 |

* cited by examiner

Primary Examiner—Michael C. Zarroli
(74) Attorney, Agent, or Firm—Winston Hsu

(57) ABSTRACT

A data control cable connecting between a mobile device and a host device for establishing data communication between the mobile device and the host device. The cable contains a clock generator, which generates a data control signal used for controlling and limiting when the host device can send data to the mobile device. When the data control signal is output to the host device, the host device is permitted to transmit data to the mobile device.

8 Claims, 6 Drawing Sheets

DATA CONTROL CABLE FOR CONNECTING A MOBILE DEVICE TO A HOST DEVICE

BACKGROUND OF INVENTION

1. Field of the Invention

The present invention relates to cable for connecting a mobile device to a host device, and more specifically, to a cable for controlling a data transmission rate between a mobile device and a host device.

2. Description of the Prior Art

Since modern day mobile devices such as cellular phones have General Packet Radio Service (GPRS) capabilities, mobile devices can be used to connect host devices, such as notebook computers, to the Internet. The mobile device can communicate with the host device through a data bus interface that is similar to the method in which a computer communicates with a modem.

Please refer to FIG. 1. FIG. 1 is a block diagram of a host device 10 communicating with a modem 14 according to the prior art. The host device 10 and the modem 14 send and receive data signals 16, 18 and control signals 20, 22 for exchanging information between the host device 10 and the modem 14. Data signal 16 is sent from the host device 10 as transmitted data (Tx) and received by the modem 14 as received data (Rx). Similarly, data signal 18 is sent from the modem 14 as Tx and received by the host device 10 as Rx. Data signals 16, 18 each transmit serial data at a predetermined baud rate. The baud rate is defined as the transmission rate of one bit of data in each byte, the byte containing eight data bits, a start bit, and a stop bit.

Control signal 20 is sent from the modem 14 as a clear to send (CTS) signal and received by the host device 10 as a request to send (RTS) signal. Likewise, control signal 22 is sent from the host device 10 as a CTS signal and received by the modem 14 as an RTS signal. When the host device 10 sends the CTS signal 22 with a value of "1" to the modem 14, this indicates that the host device 10 can accept data received from the modem 14 on data signal 18. On the other hand, when the host device 10 sends the CTS signal 22 with a value of "0" to the modem 14, this indicates that the host device 10 cannot currently accept data received from the modem 14 on data signal 18. Instead, the modem 14 should wait until the host device 10 issues the CTS signal 22 with a value of "1" before sending data to the host device 10 on data signal 18. Since communication between the host device 10 and the modem 14 is bi-directional, data control signals 20 and 22 serve the same purpose. Therefore, the modem 14 is also able to issue the CTS signal 20 to the host device 10 for controlling the flow of data on the data signal 16 from the host device 10 to the modem 14.

Please refer to FIG. 2. FIG. 2 is a diagram of a host device 30 which can communicate with a mobile device 42 according to the prior art. The host device 30 communicates with the mobile device 42 through a cable 36. The cable 36 has a serial connector 38 that plugs into a corresponding serial port 34 on the host device 30. The cable 36 also has an earphone connector 40 that plugs into a corresponding earphone jack 44 on the mobile device 42. The serial connector 38 is typically an RS-232 serial connector, although any serial connector can be used instead. Due to limitations of the earphone connector 40, only two data signals can be transmitted back and forth between the host device 30 and the mobile device 42. Therefore, unlike the host device 10 and the modem 14, no control signals can be sent between the host device 30 and the mobile device 42.

Please refer to FIG. 3. FIG. 3 is a block diagram of the host device 30 communicating with the mobile device 42 according to the prior art. As mentioned before, only two data signals 46, 48 are sent between the host device 30 and the mobile device 42. Data signal 46 is sent from the host device 30 as Tx and received by the mobile device 42 as Rx. Similarly, data signal 48 is sent from the mobile device 42 as Tx and received by the host device 30 as Rx. Using the cable 36, bidirectional communication between the host device 30 and the mobile device 42 is possible, but problems may arise due to the lack of control signals CTS and RTS. The host device 30 has higher processing power and speed than the mobile device 42, therefore, it is possible for the host device 30 to transmit data to the mobile device 42 through the data signal 46 at a higher rate than the mobile device 42 is capable of processing, which can cause problems.

Please refer to FIG. 4A and FIG. 4B. FIG. 4A and FIG. 4B are timing diagrams illustrating the transmission of data from the host device 30 to the mobile device 42 through data signal 46. In FIG. 4A, the host device 30 is transmitting data through data signal 46 at a baud rate of 19,200 bps (bits per second). Since the earphone connector 40 is only capable of transmitting and receiving data signals 46 and 48, the CTS and RTS signals are not used. Therefore, the RTS signal shown in FIG. 4A is shown as having a constant value of "1" throughout the transmission of data signal 46. Fortunately, at the baud rate of 19,200 bps, the mobile device 42 has no trouble receiving and processing the data sent from the host device 30.

However, in FIG. 4B, the host device 30 is transmitting data through data signal 46 at a baud rate of 115,200 bps. Again, the RTS signal maintains a constant value of "1" throughout the transmission of data signal 46. Unfortunately, at this high baud rate, the mobile device 42 is not able to receive and process all of the data transmitted from the host device 30. Since the control signal RTS is not used to notify the host device 30 that the mobile device 42 is not able to receive data, the mobile device 42 will be overwhelmed, and may even crash.

SUMMARY OF INVENTION

It is therefore a primary objective of the claimed invention to provide a data control cable connecting to a mobile device and a host device for establishing data communication between the mobile device and the host device in order to solve the above-mentioned problems.

According to the claimed invention, a data control cable connects to a mobile device and a host device for establishing data communication between the mobile device and the host device. The data control cable contains a first data input port for receiving a first data sent from the host device, a second data input port for receiving a second data sent from the mobile device, a first data output port for outputting the first data received from the host device to the mobile device, a second data output port for outputting the second data received from the mobile device to the host device, a clock generator for generating a data control signal used to control when the host device is capable of sending the first data, and a control output port for outputting the data control signal generated by the clock generator to the host device.

It is an advantage of the claimed invention that the data control cable contains the clock generator for generating the data control signal. The data control signal limits the amount of data that the host device can send to the mobile device, and prevents the mobile device from being overwhelmed with data and crashing.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 5:
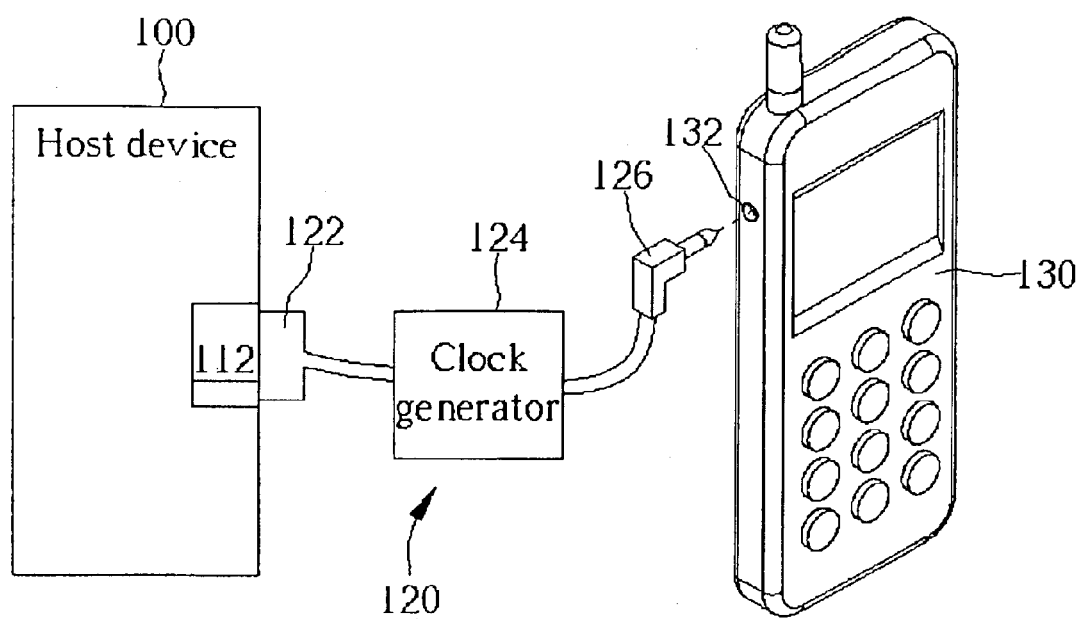
FIG. 5 is a diagram of a host device which can communicate with a mobile device according to the present invention.

Please refer to FIG. 5. FIG. 5 is a diagram of a host device 100 which can communicate with a mobile device 130 according to the present invention. For example, the host device 100 may be a computer, and the mobile device 130 may be a cellular phone. The host device 100 communicates with the mobile device 130 through a cable 120. The cable 120 has a serial connector 122 that plugs into a corresponding serial port 112 on the host device 100. The cable 120 also has an earphone connector 126 that plugs into a corresponding earphone jack 132 on the mobile device 130. Unlike the prior art cable 36, however, the cable 120 of the present invention has a clock generator 124, which will be explained below. The serial connector 122 is typically an RS-232 serial connector, although any serial connector can be used instead. Because the earphone connector 126 is only able to transmit two data signals between the host device 100 and the mobile device 130, the present invention cable 120 makes use of the clock generator 124 to provide a control signal.

Figure 6:
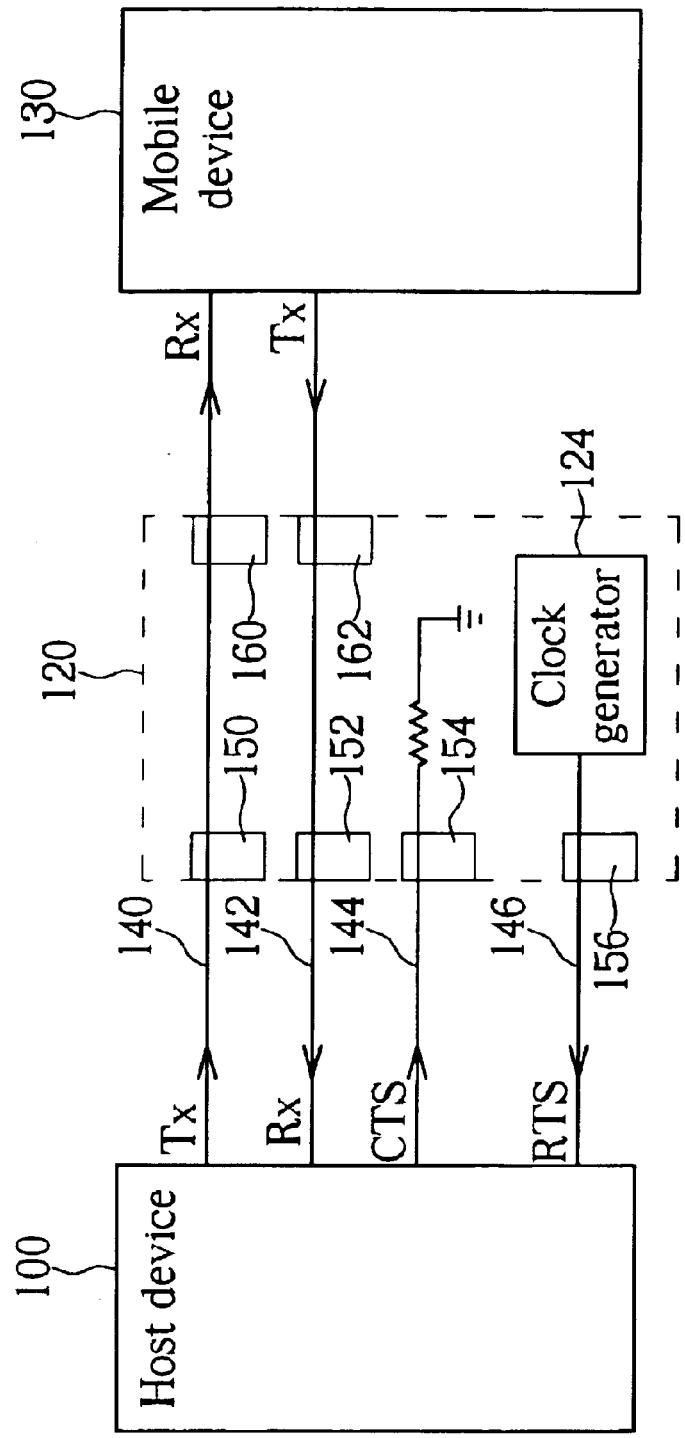
FIG. 6 is a block diagram of the host device communicating with the mobile device according to the present invention.

Please refer to FIG. 6. FIG. 6 is a block diagram of the host device 100 communicating with the mobile device 130 according to the present invention. As with the prior art, only two data signals 140, 142 are sent between the host device 100 and the mobile device 130. Data signal 140 is sent from the host device 100 as Tx through a first data input port 150 of the cable 120 and received by the mobile device 130 as Rx through a first data output port 160 of the cable 120. Similarly, data signal 142 is sent from the mobile device 130 as Tx through a second data input port 162 of the cable 120 and received by the host device 100 as Rx through a second data output port 152 of the cable 120. Unlike the prior art, the clock generator 124 generates a control signal which acts as a CTS signal sent from the mobile device 130 and received by the host device 100 as an RTS signal 146 through a control output port 156 of the cable 120. A CTS signal 144 is generated by the host device 100 and is input to the cable 120 through a control input port 154, but is not transmitted by the cable 120 since the cable 120 is not able to transmit additional signals and since the host device 100 typically has much greater data processing ability than the mobile device 130.

The RTS signal 146 generated by the clock generator 124 controls the rate at which the host device 100 is able to send data to the mobile device 130. A user of the cable 120 is able to set both the frequency and the duty cycle of the RTS signal 146 generated by the clock generator 124 to adjust a data transfer rate. By adjusting the frequency and duty cycle of the RTS signal 146 according to the specifications of the mobile device 130, optimum data transmission rates can be obtained.

Figure 1:
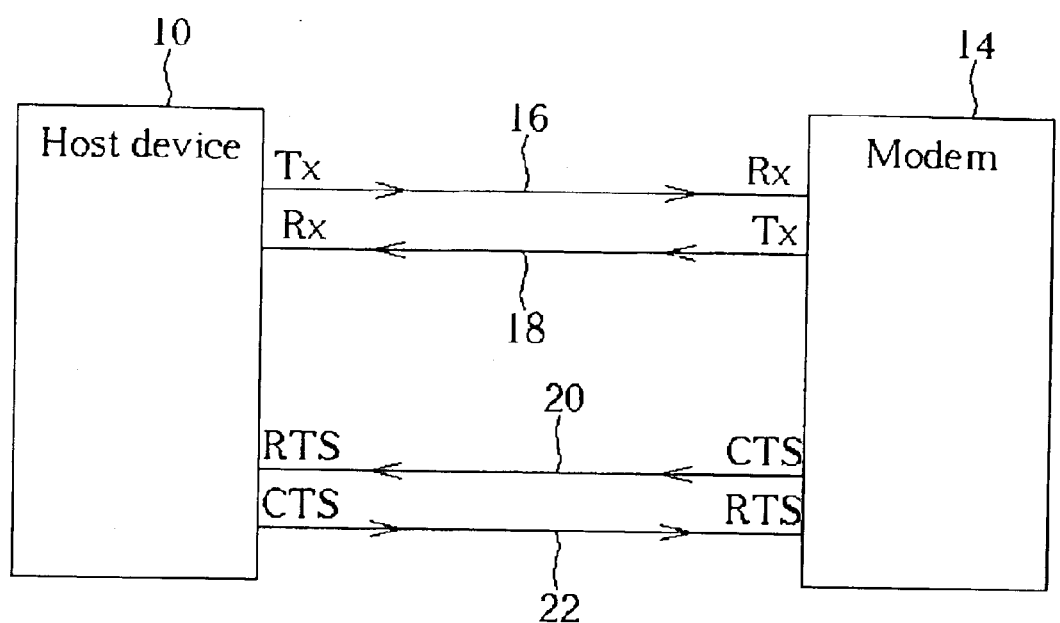
FIG. 1 is a block diagram of a host device communicating with a modem according to the prior art.
Figure 2:
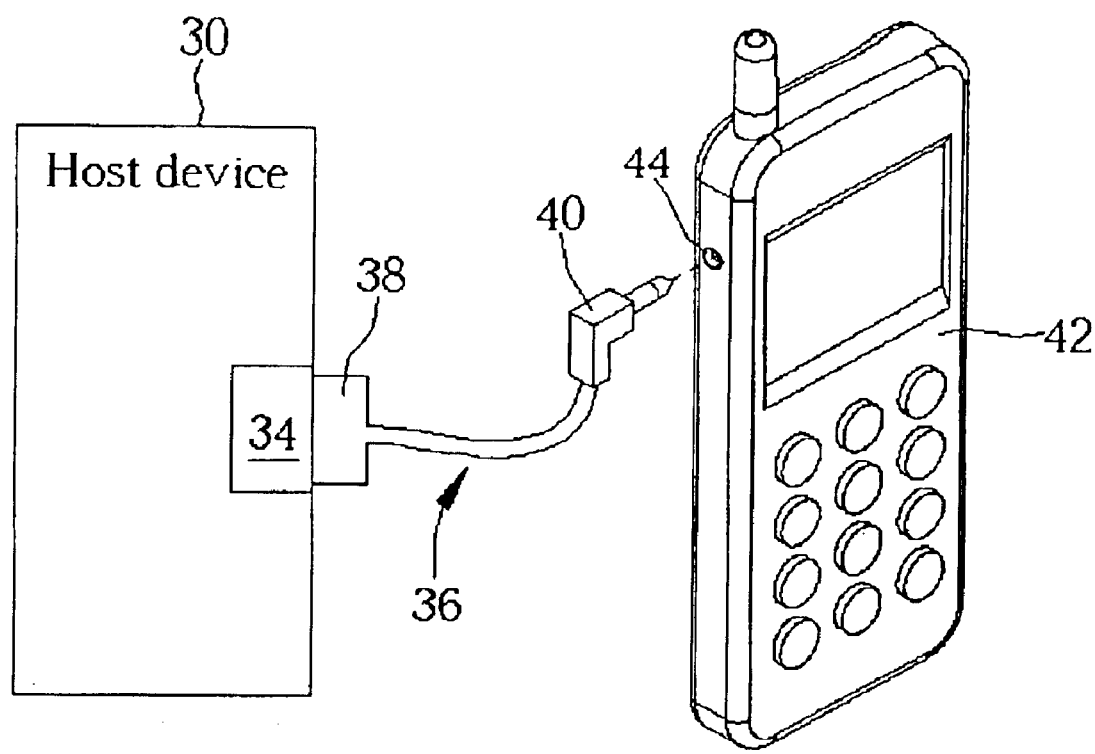
FIG. 2 is a diagram of a host device which can communicate with a mobile device according to the prior art.
Figure 3:
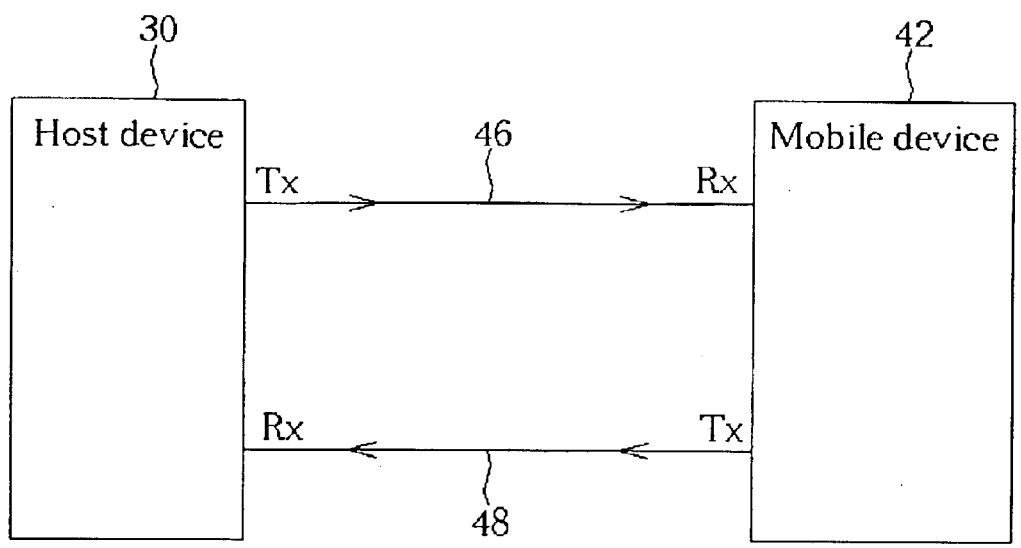
FIG. 3 is a block diagram of the host device from FIG. 2 communicating with the mobile device according to the prior art.
Figure 4A:
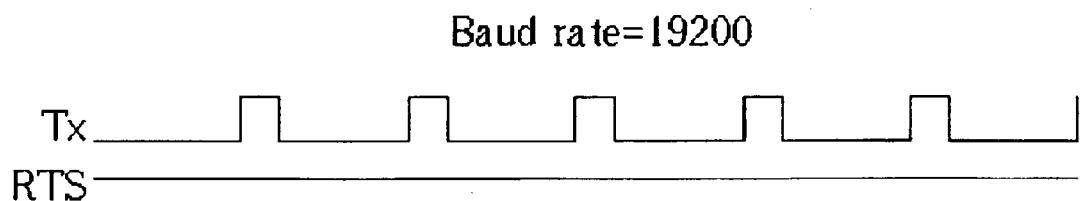
FIG. 4A and FIG. 4B are timing diagrams illustrating the transmission of data from the host device to the mobile device through a data signal according to the prior art.
Figure 4B:
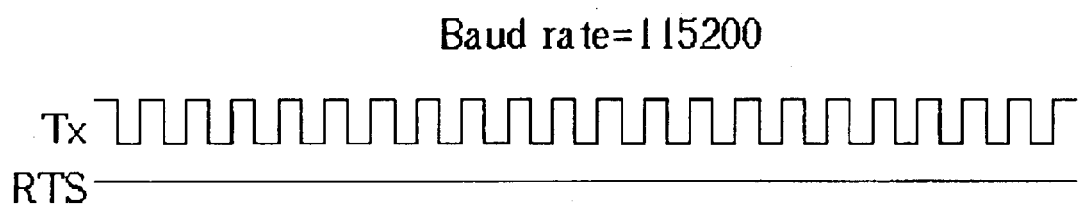
Figure 4C:
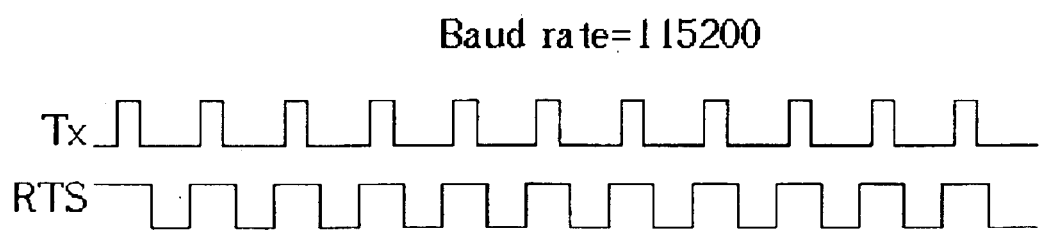
FIG. 4C is a timing diagram illustrating the transmission of data from a host device to a mobile device according to the present invention.

Please refer to FIG. 4C with reference to FIG. 4A and FIG. 4B. FIG. 4C is a timing diagram illustrating the transmission of data from the host device 100 to the mobile device 130 according to the present invention. Unlike the prior art cable 36, which is shown in FIG. 4A and FIG. 4B, the RTS signal 146 of the present invention is not held at a value of "1". Instead, the clock generator 124 generates an oscillating value for the RTS signal 146 that is shown in FIG. 4C. Therefore, while the value of the RTS signal 146 is "0", the host device 100 is not able to transmit data to the mobile device 130. Only when the value of the RTS signal 146 is "1" will the host device 100 be able to send data to the mobile device 130 through the data signal 140. Since each bit of data is transmitted at the same rate as before, the baud rates shown in FIG. 4B and FIG. 4C are identical. However, the use of the RTS signal 146 forces the host device 100 to wait a longer period of time between transmission of successive bytes of data. Therefore, the use of the RTS signal 146 generated by the clock generator 124 lowers the throughput rate of data sent from the host device 100 to the mobile device 130, but use of the RTS signal 146 also prevents the mobile device 130 from crashing due to being overwhelmed with data from the host device 100.

Please note that the present invention is not limited to a cable that connects a cellular phone to a computer. The cable can also be used to connect any host device to a mobile device for allowing the host device to transmit and receive data signals through the mobile device.

Compared to the prior art cable 36, the present invention cable 120 contains the clock generator 124 for producing the RTS signal 146. The use of the RTS signal 146 prevents the host device 100 from transmitting data to the mobile device 130 at a rate exceeding the maximum rate at which the mobile device 130 can receive and process data. The clock generator 124 prevents the mobile device 130 from crashing, and ultimately improves data transmission from the host device 100 to the mobile device 130. Since the frequency and duty cycle of the RTS signal 146 can be adjusted, the mobile device 130 is able to receive data at the highest possible rate without crashing the mobile device 130.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A data control cable connecting to a mobile device and a host device for establishing data communication between the mobile device and the host device, the data control cable comprising:

a first data input port for receiving a first data sent from the host device;

a second data input port for receiving a second data sent from the mobile device;

a first data output port for outputting the first data received from the host device to the mobile device;

a second data output port for outputting the second data received from the mobile device to the host device;

a clock generator for generating a data control signal used to control when the host device is capable of sending the first data; and a control output port for outputting the data control signal generated by the clock generator to the host device.

2. The data control cable of claim 1 wherein the clock generator is capable of being configured for varying a frequency of the data control signal to adjust the data rate of the first data.

3. The data control cable of claim 1 wherein the clock generator is capable of being configured for varying a duty cycle of the data control signal.

4. The data control cable of claim 1 further comprising a first connector, the first connector electrically connecting the first data input port, the second data output port, and the control output port to the host device.

5. The data control cable of claim 4 wherein the first connector of the data control cable is an RS-232 connector that connects to a corresponding RS-232 connector on the host device.

6. The data control cable of claim 5 wherein the host device treats the data control signal as a clear to send (CTS) signal sent from the mobile device.

7. The data control cable of claim 1 further comprising a second connector, the second connector electrically connecting the second data input port and the first data output port to the mobile device.

8. The data control cable of claim 7 wherein the second connector of the data control cable is an earphone connector that connects to a corresponding earphone jack on the mobile device.

* * * * *